United States Patent [19]
Kitagawa et al.

[11] Patent Number: 5,270,614
[45] Date of Patent: Dec. 14, 1993

[54] LUMINESCENT MATERIAL

[75] Inventors: Masahiko Kitagawa, Shiki; Yoshitaka Tomomura; Kenji Nakanishi, both of Nara, all of Japan

[73] Assignee: Sharp Kabushiki Kaisha, Osaka, Japan

[21] Appl. No.: 877,383

[22] Filed: Apr. 29, 1992

Related U.S. Application Data

[63] Continuation of Ser. No. 505,263, Apr. 6, 1990, abandoned.

[30] Foreign Application Priority Data

Apr. 10, 1989 [JP] Japan ................................. 1-90936
Apr. 10, 1989 [JP] Japan ................................. 1-99937

[51] Int. Cl.$^5$ .......................... H01J 1/62; C09K 11/00
[52] U.S. Cl. ............................ 313/503; 313/486; 313/467; 252/301.65

[58] Field of Search ............... 252/301.65; 313/503, 313/486, 467; 427/66; 428/690, 917

[56] References Cited

U.S. PATENT DOCUMENTS

| | | | |
|---|---|---|---|
| 2,662,060 | 12/1953 | Kroger | 252/301.6 S |
| 4,340,839 | 7/1982 | Fujita et al. | 252/301.6 S |
| 4,733,128 | 3/1988 | Tohda et al. | 313/503 |
| 5,086,252 | 2/1992 | Kido | 313/503 |

Primary Examiner—Donald J. Yusko
Assistant Examiner—N. D. Patel
Attorney, Agent, or Firm—Nixon & Vanderhye

[57] ABSTRACT

A luminescent material capable of emitting a blue-green light with high luminance, which comprises a single crystalline sulfide solid solution of cubic or hexagonal system represented by the formula: $Zn_{1-(x+y)}Cd_yAl_xS$, wherein x and y satisfy $0.001 \leq x < 0.1$, $0 < y \leq 0.5$, respectively.

6 Claims, 10 Drawing Sheets

LUMINESCENT MATERIAL

This is a continuation of application Ser. No. 07/505,263, filed Apr. 6, 1990, now abandoned.

BACKGROUND OF THE INVENTION

1. Field of the Invention

The present invention relates to a luminescent material. More specifically, it relates to a luminescent material which emits a blue-green light by electron-beam excitation, light (ultraviolet ray) excitation, electric-field excitation, current-injection excitation, and plasma (ionic) excitation, and is useful as a constituent material in various luminescent devices and fluorescent members.

2. Description of the Prior Art

Conventionally, ZnO:Zn, ZnS:Ag,Cl, ZnS:Cu,Al, and ZnS:TmF$_3$ are used as blue-green luminescent materials, among which ZnO:Zn is used as a fluorescent material to be excited by low electron beam in a fluorescent display tube; ZnS:Ag,Cl, and ZnS:Cu,Al particularly used as luminescent materials to be excited by electron beam in a cathode ray tube, respectively; and ZnS:TmF$_3$ used as a luminescent material to be excited by electric field in a thin film EL device.

FIG. 19 to 21 typically show luminescent spectra of the above luminescent materials: ZnO:Zn in FIG. 19; ZnS:Ag,Cl, and ZnS:Cu,Al in FIG. 20; and Zns:TmF$_3$ in FIG. 21.

ZnO:Zn, and ZnS:Ag,Cl can be excited by electron beam or ultraviolet ray. In the former, a zinc (Zn) of interstitial site or a vacancy of oxygen (O) atom acts as a donor to highly efficiently emit greenish blue light (luminescent-peak wavelength: 505 nm). In the latter, blue light (luminescent peak wavelength: 450 nm) is emitted by so-called donor-acceptor pair luminescent mechanism wherein silver (Ag) and chlorine (Cl) act as a donor and an acceptor, respectively. Also, in the case of green-luminescent materials such as ZnS: Al,Cu, Al and Cu act as a donor and an acceptor, respectively.

Besides, in a ZnS:TmF$_3$ blue-luminescent material, since its thulium acting as a luminescent center is a rare earth element, narrow-band blue light is emitted at 485 nm wavelength basing upon the radiation transition between 4 f inner-shell electron levels ($^1G_4 \rightarrow {}^3H_6$) thereof.

However, it has been difficult for the materials of ZnO:Zn, ZnS:Ag,Cl, and ZnS:Cu,Al to exhibit a high luminance because concentration limits of the active centers, i.e., the above vacancies or donor-acceptor pairs restrict luminescent efficiency thereof.

On the other side, the wavelength (energy) of the greenish blue light emitted by ZnO:Zn is inherently determined by the energy level of a zinc (Zn) of interstitial site or a vacancy of oxygen atom (O) in ZnO. Similarly, the wavelength (energy) of the blue light or green light emitted by ZnS:Ag,Cl, ZnS:Cu,Al, or the like is substantially determined only by two factors i.e., an energy level defined by an Ag or Cu acceptor and Cl donor, and a distance between the acceptor and donor. Therefore, it has been difficult to vary the luminescent wavelength of each of these luminescent materials.

In this regard, using ZnCdS:Cu,Al enables to vary the green-luminescent wavelength only within a limited wavelength area (530 to 560 nm) by varying the ratio of Zn to Cd. However, the luminance and efficiency thereof have remained insufficient as ever. Further, in the case of ZnS:TmF$_3$, the luminescent energy (wavelength) is inherently defined only by the difference between the levels of 4 f inner-shell electron (energy difference between $^1G_4$ and $^3H_6$). Also, ZnS:TmF$_3$ has not had enough luminance and efficiency of the luminescence.

In short, the conventional blue- and greenish blue-light luminescent materials have not been able to exhibit a satisfactory luminance and efficiency. Besides, since the wavelength (energy) of each luminescent material is the inherent value which cannot be designed, color selectivity of the luminescence thereof is considerably restricted. As a result, it has been inconvenient in selectivity and controllability of the luminescent wavelength which are required for practical use.

SUMMARY OF THE INVENTION

The present invention is accomplished to overcome the above-mentioned problems, and is to provide a luminescent material with high luminescent efficiency and luminance. Further, this invention is to provide a luminescent material having selectivity and controllability of the luminescent wavelength as well as with high luminescent efficiency and luminance.

Thus, according to the present invention, there is provided a luminescent material comprising a sulfide solid solution represented by the formula:

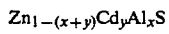

$$Zn_{1-(x+y)}Cd_yAl_xS$$

wherein x and y satisfy $0.001 \leq x < 0.1$, $0 \leq y \leq 0.5$, respectively.

Each of FIGS. 6, 7, 10, 11, 12, 13, 14, 15, 16, 17, 18 and 19 illustrates a luminescent device using a luminescent material of the present invention.

Figure 8:
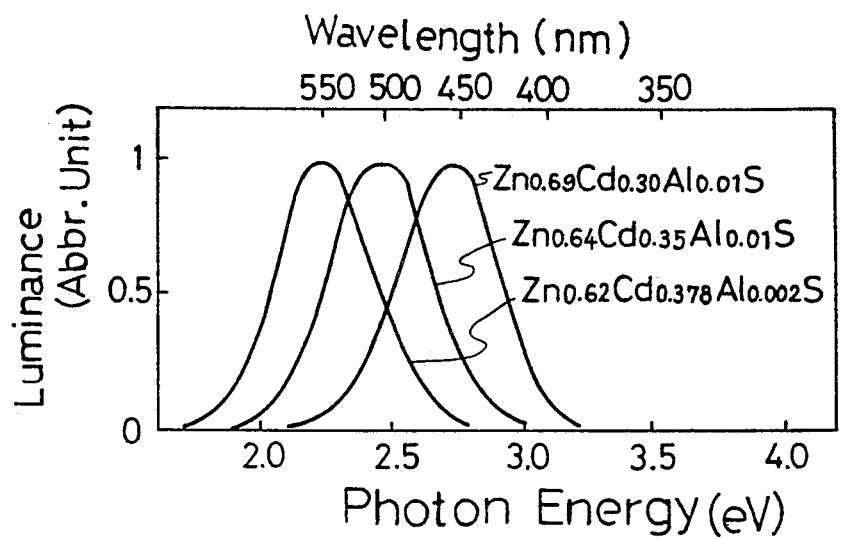

FIG. 8 is a view showing a luminescent spectrum of another example according to the invention.

Figure 9:
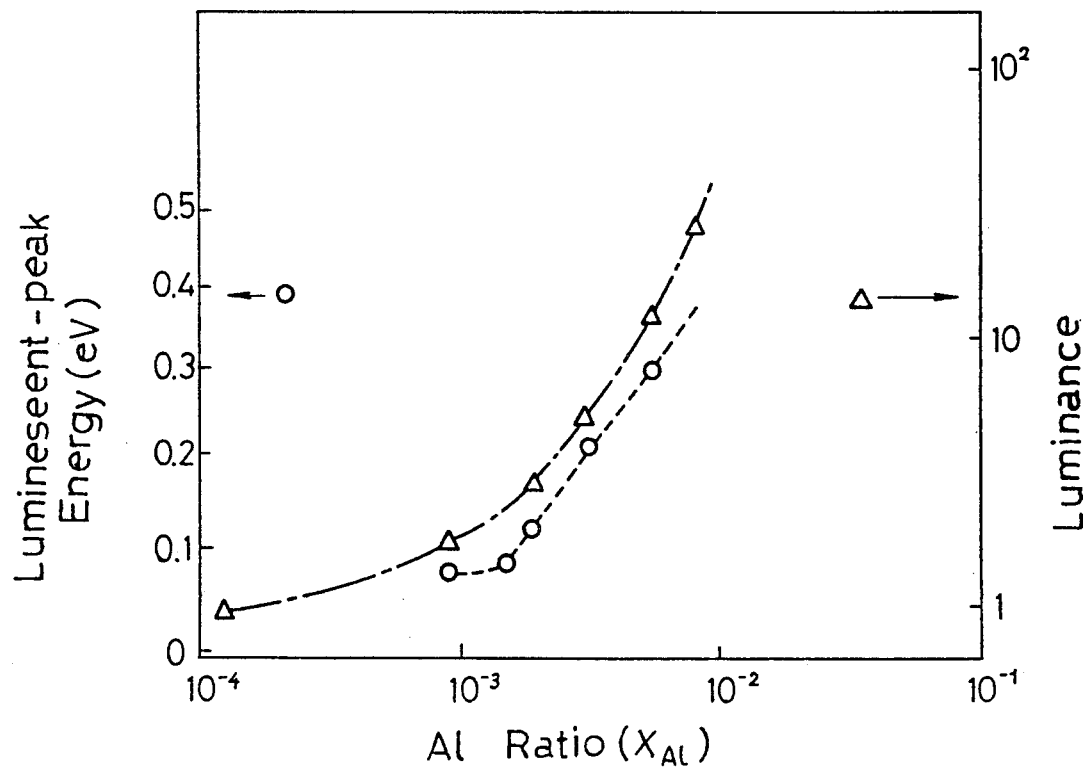

FIG. 9 is a view showing dependence of luminescent-peak energy of another example of the invention, upon Al-component ratio.

Figure 19:
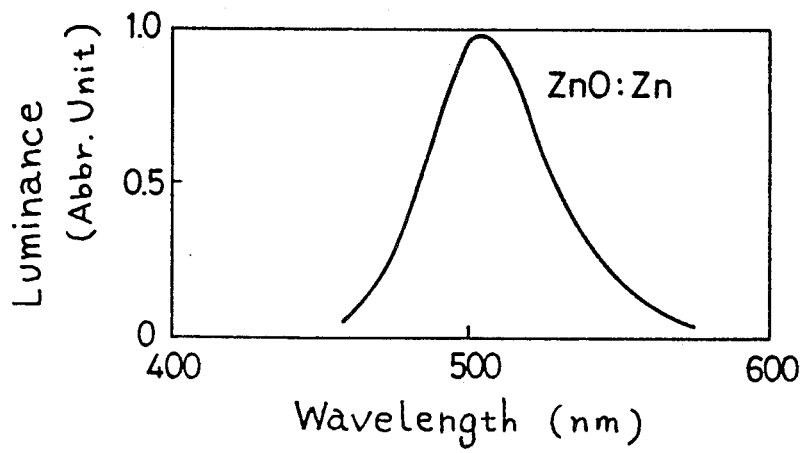
Figure 20:
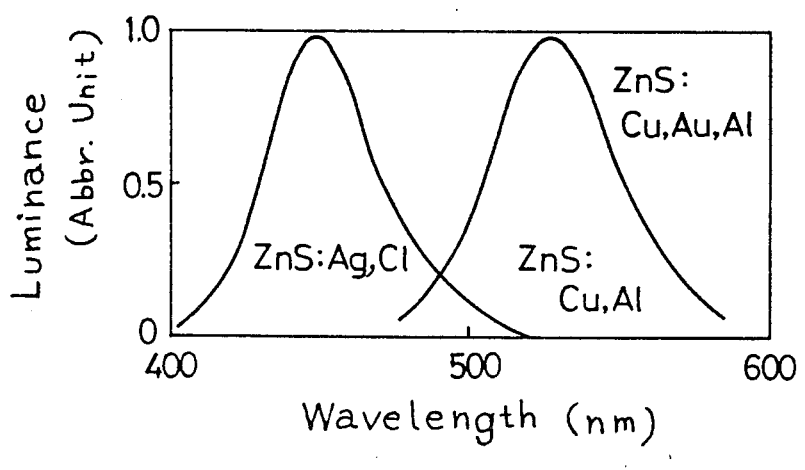
Figure 21:
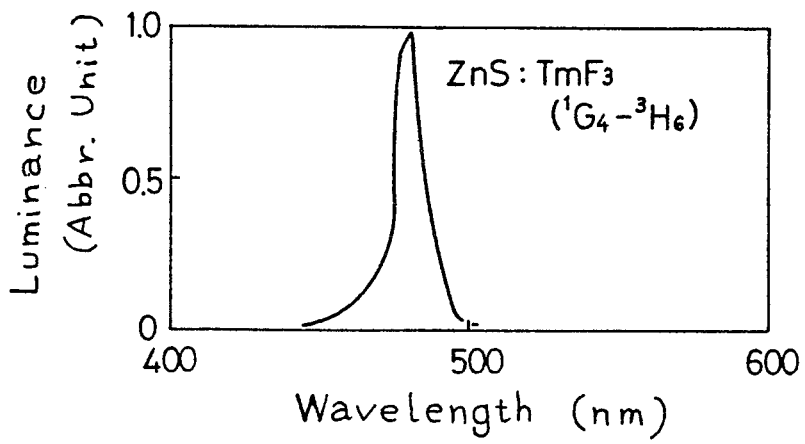

FIGS. 19 to 21 are views each of which shows luminescent spectra of conventional luminescent materials, respectively.

DESCRIPTION OF THE PREFERRED EMBODIMENTS

A luminescent material of the present invention is a cubic- or hexagonal-system solid solution of zinc cadmium aluminum sulfide or zinc aluminium sulfide. It can be represented by Zn-Cd-Al-S, or Zn-Al-S.

In the above formula: $Zn_{1-(x+y)}Cd_yAl_xS$, as the component ratio of Al represented by x increases, the luminescent wavelength tends to decrease, so the luminescent intensity increases. Therefore, x should be selected from the values more than 0.001 and below 0.1.

When x is below 0.001, the luminescent intensity is too low, when x is 0.1 or more, the luminescent wavelength is too short, for a luminescent material.

On the other hand, as the component ratio y of Cd (optional component) increases, the luminescent wavelength tends to increase. Therefore, y is preferably more than 0.299 and below 0.5. When y comes out of this range, the luminescent material does not emit desired blue-green light, therefore it is not preferable.

The luminescent material of the invention may be prepared by using, for example, Zn, Cd, Al, and S as source materials which are co-deposited to form a film on a substrate by physical vapor deposition or sputtering, or to form powder by precipitation or chemical vapor deposition.

With the luminescent-material in a film form on the substrate as described above, electrodes and the like may be further formed to construct a luminescent device. As well, the luminescent material in a powder form may be interposed between a pair of substrates to form a luminescent layer.

The Zn-Al-S type luminescent material has a crystalline structure of cubic or hexagonal system, and Al constitutes a luminescent center. Since Al is a trivalent element, it offers an excessive valence relative to bivalent Zn, therefore, it makes up virtually for the valences of Zn. That is, due to the presence of Al atom having a low vapor pressure, concentration of Zn atom having a higher vapor pressure and smaller bonding strength than Al atom decreases to maintain electrical neutrality as a solid solution. Al atom is stabilized by locating a vacancy of Zn atom at the nearest lattice position thereof, so that Al atom accompanied by Zn vacancy at the nearest lattice position thereof constitutes an Al atom-Zn vacancy pair, resulting in an extremely localized center.

Since the center formed by the Al atom-Zn vacancy pair is intensively localized as small as a lattice radius (approximately 2.6 Å) or less, energy difference of more than 3 eV is produced between a normal state and excited state, so that more than 2.7 eV of luminescent transition energy can be produced to emit blue light (equivalent to more than 2.6 eV) even if Frank-Condon shift is taken into consideration. Further, since the luminescent center is localized and concentration thereof is substantially as high as the Al concentration of the solid solution, which is extremely higher (by two digits) than that of a conventional luminescent material of donor-acceptor pair type, decrease in luminescent efficiency caused by interaction between the luminescent centers is very small, resulting in a high luminance.

When Cd is present in the above luminescent material, an Al atom-Cd vacancy pair is produced in addition to an Al atom-Zn vacancy pair to form a 4-coordinate solid solution. In this case, Al atom-vacancy pairs comprising Al atom-Zn vacancy and Al atom-Zn vacancy constitutes localized centers. The center is intensively localized as small as a radius of the lattice so that an energy difference depending on a component ratio represented by y ($y \geq 0.1895$) in $Zn_{1-(x+y)}Cd_y$ is produced between a normal state and excited state. Therefore, it becomes possible to emit blue-green light equivalent to 2.25 to 2.8 eV even if Frank-Condon shift is taken into consideration. In this Zn-Cd-Al-S luminescent material, the luminescent wavelength (energy) can be varied by adjusting the Al component ratio (x) which is a criterion of the luminescent-center concentration as well as by varying the above component parameter (y), the ratio of Cd to Zn. Thus, the luminescent wavelength (energy) can be designed by varying the parameter x or y. In addition, since the luminescent center is localized and concentration thereof is substantially as high as the Al concentration of a solid solution, which is extremely higher (by two digits) than that of a conventional luminescent material of donor-acceptor pair type, decrease in luminescent efficiency caused by interaction between the luminescent centers is very small, resulting in blue-green luminescence of a high luminance.

EXAMPLE

Figure 1:
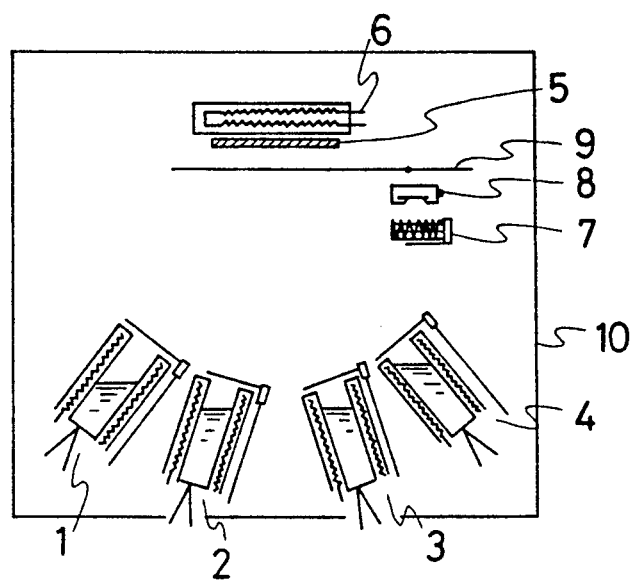
FIG. 1 is an explanatory view showing an apparatus for preparing a luminescent material of the invention.

FIG. 1 shows an apparatus for preparing a luminescent material of the invention. In FIG. 1, reference numeral 1 denotes an aluminum (Al) source consisting of a crucible accommodating source aluminum (6N), the crucible being provided with a heater, a thermoelectric couple, and a shutter for controlling evaporation of the source. Similarly, reference numeral 2 denotes a zinc (Zn) source consisting of a crucible accommodating source zinc (6N), the crucible being provided with a heater, a thermoelectric couple, and a shutter for controlling evaporation of the source. As well, reference numeral 3 denotes a cadmium (Cd) source consisting of a crucible accommodating source cadmium (6N), the crucible being provided with a heater, thermoelectric couple, and a shutter for controlling evaporation of the source. Also, reference numeral 4 denotes a sulfur (S) source consisting of a crucible accommodating a source sulfur (5N), the crucible being provided with a heater, a thermoelectric couple, and a shutter for controlling evaporation of the source. A substrate 5 is disposed on a substrate holder 6 for heating. An ion gauge 7 is utilized to measure and control a beam intensity of a source vapor generated from each source. A film-thickness monitor 8 is utilized to measure and control a deposition amount and a deposition speed. Finally, 9 and 10 denote a deposition controlling shutter disposed in front of the substrate, and a vacuum deposition container, respectively.

In such vapor-depositing apparatus of ultra-high vacuum, heating portions of aluminum (Al) source, zinc (Zn) source, cadmium (Cd) source (optional), and sulfur (S) source, were heated independently to adjust the supplying ratio of aluminum (Al), zinc (Zn), cadmium (Cd), and sulfur (S) for the definition of the component ratios of the composition to be deposited on the substrate 5. The component ratios of the composition and the structure thereof were measured using X ray diffraction and electron-beam diffraction.

(Preparation of a $Zn_{1-x}Al_xS$ luminescent material)

EXAMPLE 1

A film was prepared under the following conditions; background pressure for film growth: less than $10^{-9}$ Torr; substrate temperature: 250° C.; temperatures of the vapor sources: 950° C. at the crucible for aluminum, 350° C. at the crucible for zinc, and 50° C. at the crucible for sulfur; and molecular-beam pressures of the vapors: $10^{-9}$ Torr for aluminum, $1 \times 10^{-6}$ Torr for zinc, and $5 \times 10^{-6}$ Torr for sulfur. Under the above conditions, the film-growth speed was more than 1 μm/hr; $5 \times 10^{19}$ cm$^{-3}$ of Al was in a solid solution state; and a component ratio of Al was approximately $2 \times 10^{-3}$ at. %, therefore, component ratios of Zn-Al-S were Zn: approximately 49.8%, Al: 0.2%, and S: 50% ($Zn_{1-x}Al_xS$: $x \equiv x_{Al} = 0.004$). The reflective electron-beam diffraction analysis revealed that this film had a cubic system and a lattice constant thereof was approximately 5.40 A. A component ratio of Al represented by x was able to vary within the range from approximately 0.05 to approximately 10 at. % by varying the evaporation condition (evaporation temperature) of Al from 800° C. to 1250° C. under the above conditions except the evaporation condition of Al so as not to largely vary, for example, the film-growth speed.

Figure 2:
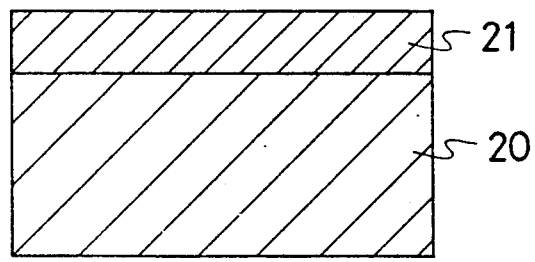
FIG. 2 is a view showing a layer of the luminescent material of the invention formed on a ZnS substrate.

FIG. 2 shows a Zn-Al-S luminescent material in the form of film. In this figure, reference numeral 20 denotes a single-crystal face (100) of cubic-ZnS used as the substrate, and 21 denotes the Zn-Al-S luminescent material. The difference in lattice constant between ZnS and Zn-Al-S is very small and they have the same crystalline structure (cubic system), so that a Zn-Al-S film 21 of the luminescent material has a single-crystalline structure.

Figure 3A:
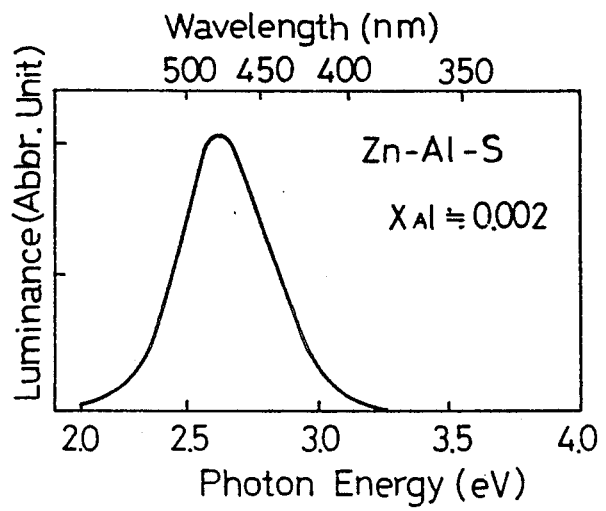
FIGS. 3(A) to 3(C) are views each of which shows a luminescent spectrum by the examples of the invention, respectively.
Figure 3B:
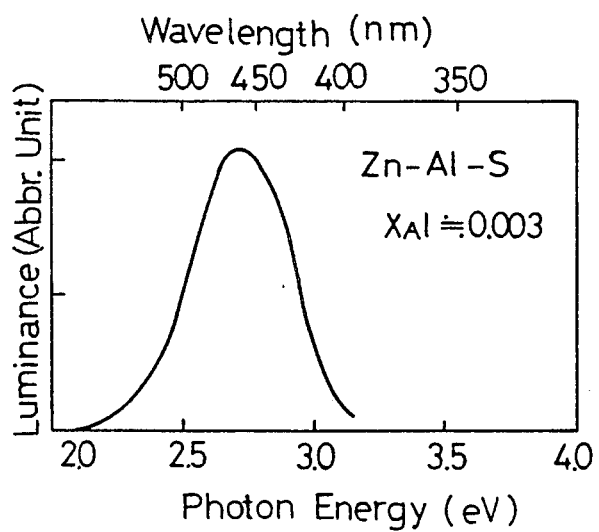
Figure 3C:
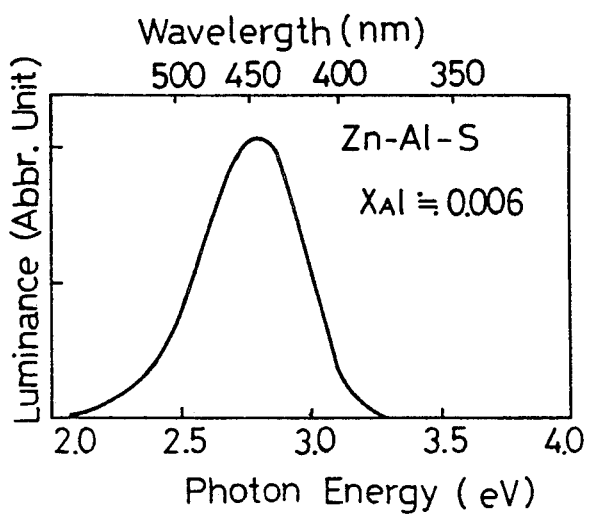

Each of FIGS. 3(A) to 3(C) shows dependence of a luminescent spectrum upon Al-component ratio ($x_{Al}$), where a horizontal line and vertical line represent a luminescent wavelength and luminescent intensity, respectively. When the component ratio ($x_{Al}$) is 0.002, the luminescent wavelength is 480 nm (2.58 eV). As the component ratio ($x_{Al}$) increases, the wavelength becomes short (high energy), for example, when $x_{Al}^2 = 0.003$, the wavelength is 460 nm (2.70 eV); when $x_{Al}^3 = 0.006$, the wavelength is 440 nm (2.82 eV), and so forth. Each of the above wavelengths belongs to the wavelength area of blue luminescence.

Additionally, when the Al-component ratio further increases, the wavelength can be further shortened.

Figure 4:
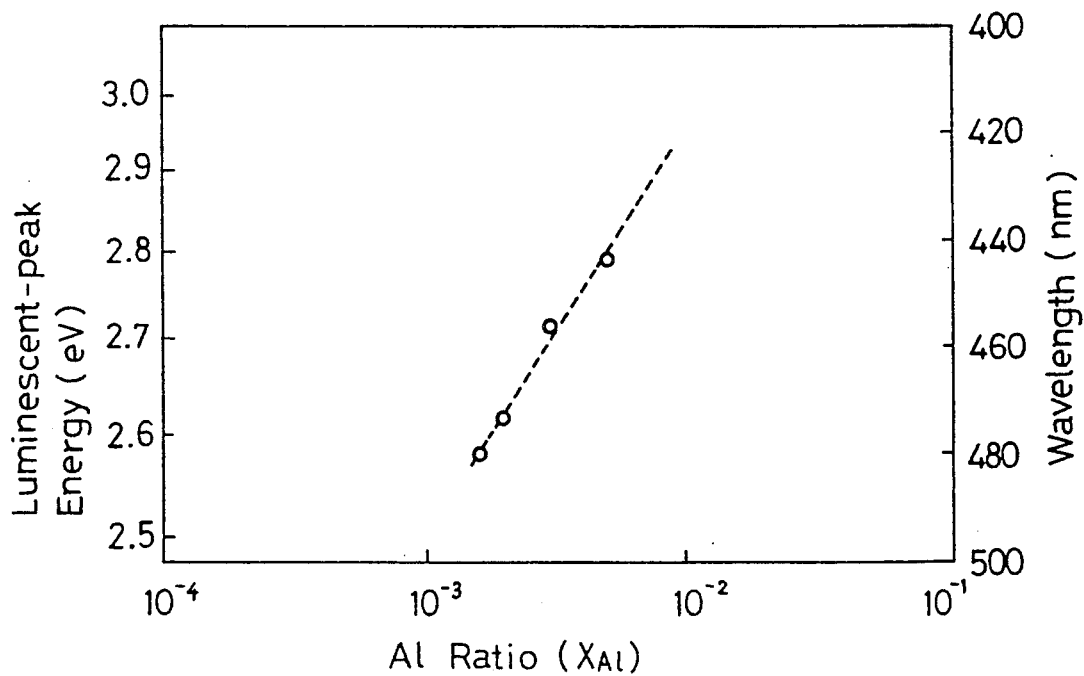
FIGS. 4 and 5 are views each of which shows dependence of luminescent-peak energy and luminescent-peak intensity of the luminescent material of the invention upon Al-component ratio, respectively.
Figure 5:
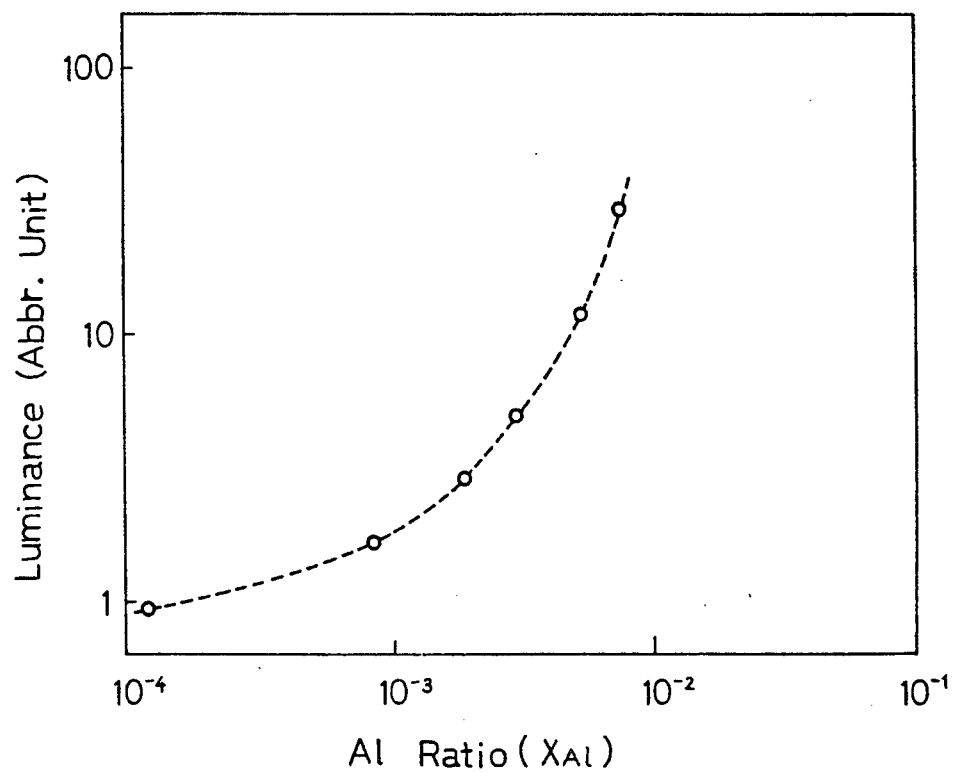

FIG. 4 shows dependence of a luminescent peak wavelength (peak energy) upon Al-component ratio, and FIG. 5 shows dependence of a luminescent intensity upon Al-component ratio. The luminescent intensity as well as the luminescent efficiency increases with the increase of Al component ratio. It is apparent from the figures that, in a luminescent material having a far larger Al-ratio, i.e., a violet-ultraviolet luminescent material, the luminescent intensity thereof further increases.

EXAMPLE 2

Figure 6:
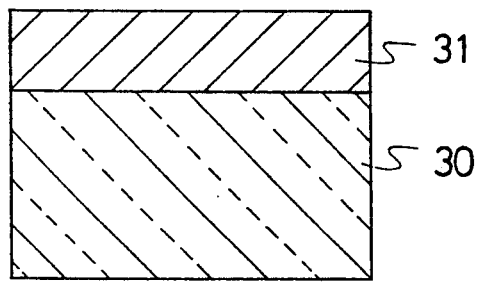

FIG. 6 shows the second example of the luminescent material. In this figure, reference numeral 30 denotes a transparent substrate of polycrystalline ZnS prepared by halogen chemical transport method, 31 denotes a Zn-Al-S layer deposited on a substrate 30.

The Zn-Al-S layer 31 ($x_{Al} = 0.004$) as a luminescent layer exhibits a blue luminescence of a high luminance (luminescent peak wavelength: 450 nm) by a light excitation (ultraviolet rays of 365 nm, 315 nm, and 325 nm supplied from an Hg lamp, Xe lamp, and He-Cd laser, respectively). Such a luminescent material formed on the ZnS substrate emits blue light from both the substrate side and luminescent layer side. This is suitable for a luminescent device using an electron or charge particle beam.

EXAMPLE 3

Figure 7:
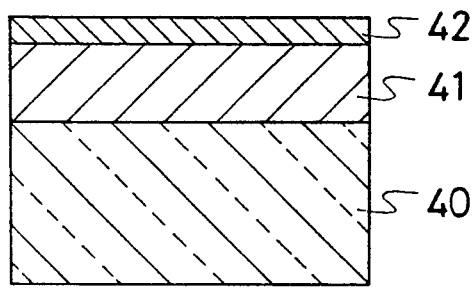

FIG. 7 shows the third example of the luminescent material. In this figure, reference numeral 40 denotes a glass substrate; 41 denotes a Zn-Al-S luminescent layer; and 42 denotes an Al film of 50 to 300 A thick. This luminescent-material layer is suitable as a blue-luminescent material using an electron beam.

(preparation of a $Zn_{1-(x+y)}Cd_yAl_xS$ material)

EXAMPLE 4

A film was prepared under the following conditions; bacground pressure: $10^{-9}$ Torr; substrate temperature: 250° C.; temperatures of the vapor sources: 1050° C. at the crucible for aluminum, 350° C. at the crucible for zinc, 250° C. at the crucible for cadmium, and 50° C. at the crucible for sulfur; and molecular-beam pressures of the vapors: $10^{-8}$ Torr for aluminum, $1 \times 10^{-6}$ Torr for zinc, $3 \times 10^{-7}$ Torr for cadmium and $5 \times 10^{-6}$ Torr for sulfur. Under the above conditions, the film-growth speed was 1 μm/hr; $1.1 \times 10^{20}$ cm$^{-3}$ of Al was in a solid solution state; and a component ratio of Al was approximately $5 \times 10^{-3}$ at. %, therefore, component ratios (atomic %) of Zn-Cd-Al-S were Zn: approximately 34.50%, Cd: 15.00%, Al: 0.5%, and S: 50% ($Zn_{1-x-y}Cd_yAl_xS: x \equiv 0.01$, y=0.30). The reflective electron-beam diffraction analysis revealed that this film had a cubic system and a lattice constant thereof was approximately 5.480 A.

Under the above conditions, component ratios of Zn, Cd, and Al are determined by the values x and y. However, they are substantially determined if only y is decided. Therefore, by varying the evaporation condition (vapor temperature) of Al from approximately 800° C. to 1100° C., the value x was approximatedly adjusted from 0.05% to 1.0% with the evaporation conditions of Zn and Cd fixed so that the component ratios of Zn and Cd may be 1−y, and y, respectively. The value x in the range from 1.0% to 10% was adjusted basing upon the experiment on the amount of evaporation of each of Zn, Cd, and Al (the amount of deposition of individual component) previously measured. The $Zn_{0.69}Cd_{0.30}Al_{0.01}S$ film thus obtained under the above conditions exhibited a luminescence with its peak luminescent at 450 nm (2.75 eV) under an ultraviolet-ray excitation (light excitation of 365 nm using an Hg lamp).

Similarly, a film was prepared under the following conditions; background pressure for film growth: $10^{-9}$ Torr; substrate temperature: 250° C.; temperatures of the vapor sources: 1020° C. at the crucible for aluminum, 330° C. at the crucible for zinc, 250° C. at the crucible for cadmium, and 50° C. at the crucible for sulfur; and molecular-beam pressures of the vapors: $8 \times 10^{-9}$ Torr for aluminum, $8 \times 10^{-7}$ Torr for zinc, $3 \times 10^{-7}$ Torr for cadmium and $5 \times 10^{-6}$ Torr for sulfur. In this case, component ratios (atomic %) of Zn-Cd-Al-S were Zn: approximately 32.00%, Cd: 17.50%, Al: 0.5%, and S: 50% ($Zn_{1-x-y}Cd_yAl_xS: x \equiv 0.01$, y=0.35). A lattice constant of this film was approximately 5.51 A.

The $Zn_{0.640}Cd_{0.350}Al_{0.010}S$ film thus obtained under the above conditions exhibited a luminescence with its peak luminescent at 500 nm (2.48 eV) under an ultraviolet-ray excitation (light excitation of 365 nm using an Hg lamp).

As well, a film was prepared under the following conditions; background pressure: $10^{-9}$ Torr; substrate temperature: 250° C.; temperatures of the vapor sources: 950° C. at the crucible for aluminum, 330° C. at the crucible for zinc, 250° C. at the crucible for cadmium, and 50° C. at the crucible for sulfur; and molecular-beam pressures of the vapors: $2 \times 10^{-9}$ Torr for aluminum, $8 \times 10^{-7}$ Torr for zinc, $3 \times 10^{-7}$ Torr for cadmium and $5 \times 10^{-6}$ Torr for sulfur. In this case, component ratios (atomic %) of Zn-Cd-Al-S were Zn: approximately 31.00%, Cd: 18.90%, Al: 0.10%, and S: 50% ($Zn_{1-x-y}Cd_yAl_xS: x \equiv 0.002$, y=0.378). This film had also a cubic system, and a lattice constant thereof was approximately 5.50 A. The $Zn_{0.620}Cd_{0.378}Al_{0.002}S$ film thus obtained exhibited luminescence with its peak luminescent at 550 nm (2.25 eV) under an ultraviolet-ray excitation (light excitation of 365 nm using an Hg lamp). The structure of the Zn-Cd-Al-S luminescent material thus prepared in the form of a film was as same as that shown in FIG. 2.

In the above preparation examples, since the differences in lattice constant between the ZnS substrates and the Zn-Cd-Al-S materials were fairly large (approximately 1% to 2% of difference), the obtained films had many deformations though their crystalline structures were the same cubic system as those of the substrates. Using, for example, GaP (lattice constant: 5.45 A) as a substrate made the monocrystalline film of this composition better in crystallization. Additionally, since the sulfide component is a chalcogen, a half of the amount of deposition when Cd and AL are not added was decided as the component ratio of sulfur. Ratios of other components were confirmed by chemical analysis, EPMA, SIMS, or the like.

FIG. 8 shows dependence of luminescent spectrum upon component ratios of the material, where a horizontal line represents the luminescent wavelength, and a vertical line represents the luminescent intensity.

Changing the component ratios of the material made it possible to vary the luminescent peak wavelength with high selectivity.

FIG. 9 shows dependence of the luminescent peak wavelength (peak energy) and the luminescent peak intensity upon Al-component ratio. As the Al-component ratio increases, the peak wavelength shifts to the shorter-wavelength (high energy) side. When the Al-component ratio increases from 0.01% to 1%, the peak wavelength shifts to the higher energy side by approximately 0.4 eV. The variation of luminescent energy by varying the value x (0.4 eV per %) is larger than that by varying the value y (0.01 eV per %). Therefore, the luminescent energy (wavelength) can be easily controlled by varying the value x.

In addition, since the luminescent intensity increases with the increase of the Al-component ratio, the luminescent material having a high Al-component ratio with the values x and y further increased is more suitable as a luminescent material of a high luminance.

EXAMPLE 5

Figure 10:
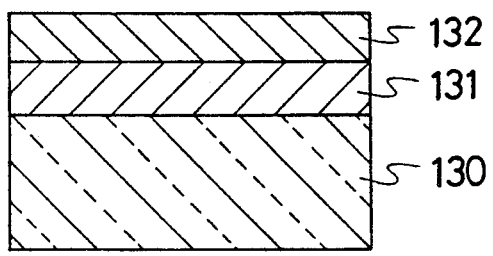

FIG. 10 shows the 5th example of the invention. This is the case where a multicolor-luminescent material is prepared. FIG. 10 includes a transparent single-crystalline substrate of ZnS 130 prepared by halogen chemical transport method, a $Zn_{0.62}Cd_{0.378}Al_{0.002}S$ luminescent-material layer 131, and a $Zn_{0.610}Cd_{0.360}Al_{0.030}S$ luminescent-material layer 132. In this example, only the Al-component ratio was varied, substantially. The Al-component ratios of the layers 131 and 132 were 0.1 at. %, and 1.5 at. %, respectively. Respective luminescent wavelengths were 550 nm (2.25 eV) and 450 nm (2.75 eV). The film thicknesses of both films were the same (0.5 μm) in this double-layered type luminescent material. The luminescent wavelength as well as the luminescent intensity (shown in FIG. 9) varied only with variation of the Al-component ratio. The luminescent intensity of the layer 132 (Al-component ratio: 1.5 at. %) was 10 times or more as high as that of the layer 131 (Al-component ratio: 0.1 at. %), so that 10 times or more visibility was able to be obtained. Such a luminescent material in which the luminescent wavelength and luminescent intensity can be independently designed is particularly useful as a luminescent material for display. Further, besides this example, the luminescent material of the invention can be designed as above in combining other luminescent materials for another wavelength. This is an outstanding feature of the invention. Since this luminescent material is provided on the ZnS transparent substrate, blue light is emitted from both the substrate side and luminescent-layer side. Therefore, this is suitable for a luminescent device excited by ultraviolet ray, electron beam, charge particle beam, or the like. In addition, it is apparent that such a multi-layered film can easily provide a multicolor luminescent member if the film structure and excitation method are devised, so it is useful in a multicolor luminescent device.

EXAMPLE 6

Figure 11:
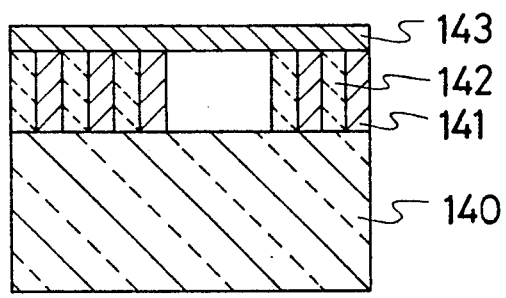

FIG. 11 shows the 6th example of the invention. This is another example of a multicolor luminescent material prepared on a glass substrate, which incorporates a glass substrate 140, a $Zn_{0.62}Cd_{0.378}Al_{0.002}S$ portion 141, and a $Zn_{0.610}Cd_{0.360}Al_{0.030}$ portion 142. The wavelengths emitted from the portions 141 and 142 are 550 nm, and 450 nm, respectively. This provides a blue-green luminescent material as a two dimensional multicolor display. This luminescent material layer is suitable as a blue-green luminescent material with an electron beam.

OTHER EXAMPLES

Figure 12:
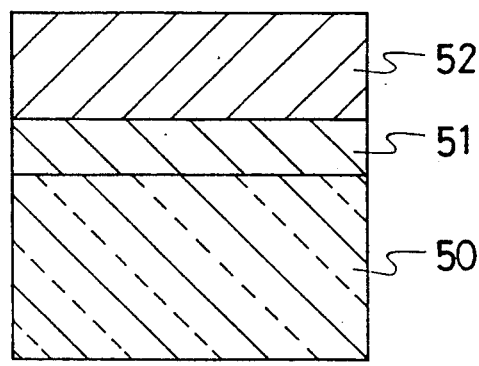

FIG. 12 shows the 7th example of the invention, which comprises a glass substrate 50, an conductive transparent layer 51 (In-Sn-O), and Zn-Al-S or Zn-Cd-Al-S film 52, and is suitable as a luminescent device using an electron beam.

Figure 13:
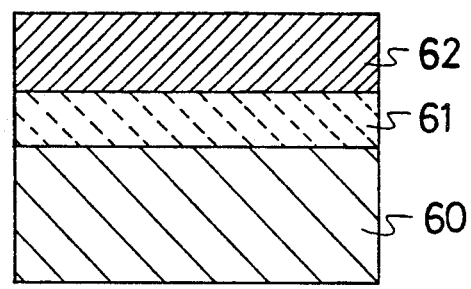

FIG. 13 shows the 8th example of the invention, which comprises a plastic substrate 60 of vinyl chloride, polyethylene, polystyrene, epoxy, or the like, an conductive plastic 61, and a Zn-Al-S or Zn-Cd-Al-S film 62.

Figure 14:
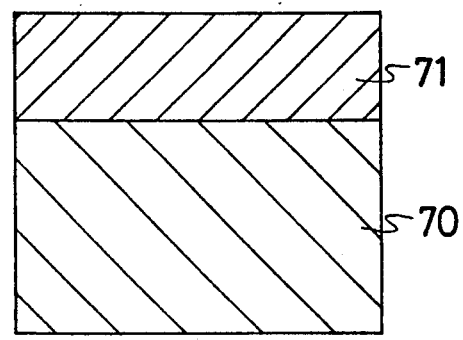

FIG. 14 shows the 9th example of the invention, which comprises a Si substrate 70, and a Zn-Al-S or Zn-Cd-Al-S layer 71.

Both of the 8th and 9th examples are suitable as a blue-luminescent device.

Figure 15:
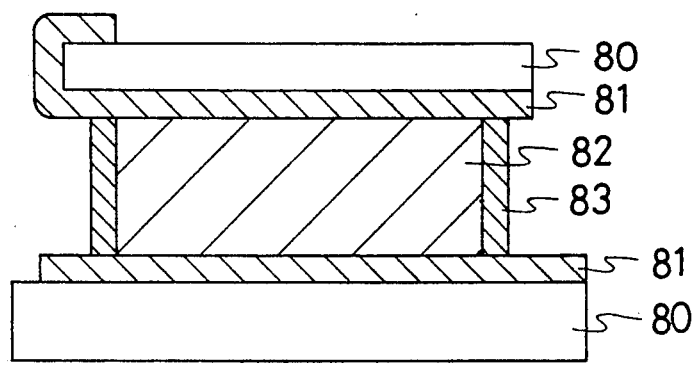

FIG. 15 shows the 10th example of the invention, which comprises a glass substrate 80, an conductive transparent film 81, a dispersion layer of powdery Zn-Al-S or Zn-Cd-Al-S luminescent material 82, and a glass spacer 83. This example is highly suitable as a dispersive-type blue-ultraviolet luminescent device of AC drive.

Figure 16:
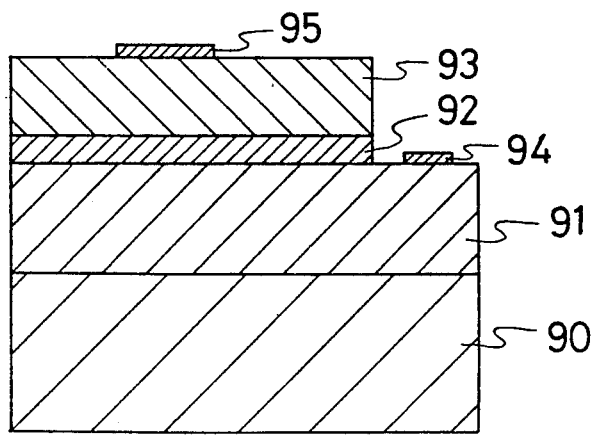

FIG. 16 shows the 11th example, which comprises a ZnS substrate 90, a ZnS:Al epitaxial single-crystalline layer (conductive layer) 91, a Zn-Al-S or Zn-Cd-Al-S luminescent-material layer 92, an epitaxial single-crystal carrier injection layer of ZnS:K or ZnS:As 93, and electrodes 94 and 95. The Zn-Al-S or Zn-Cd-Al-S luminescent layer 92 is useful as a luminescent layer in the injection-type blue-luminescent device.

Figure 17:
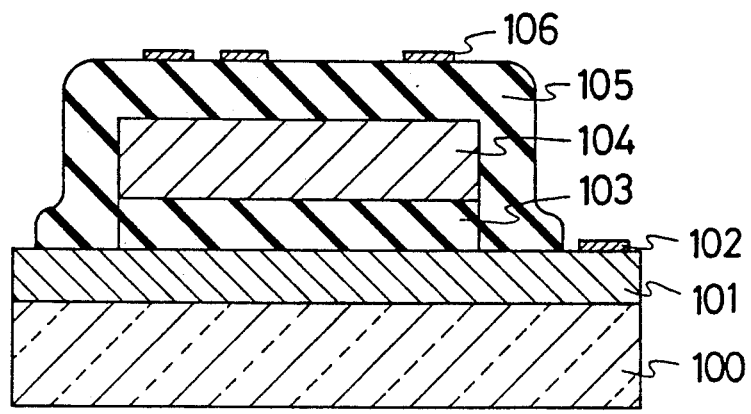

FIG. 17 shows the 12th example of the invention, which comprises a glass substrate 100, a conductive transparent film 101, a Zn-Al-S or Zn-Cd-Al-S luminescent-material layer 104, insulating layers 103 and 105, and electrodes 102 and 106. In such an EL device having a double-insulation structure, Zn-Al-S or Zn-Cd-Al-S luminescent layer exhibits a blue luminescence of a very high luminance.

Figure 18:
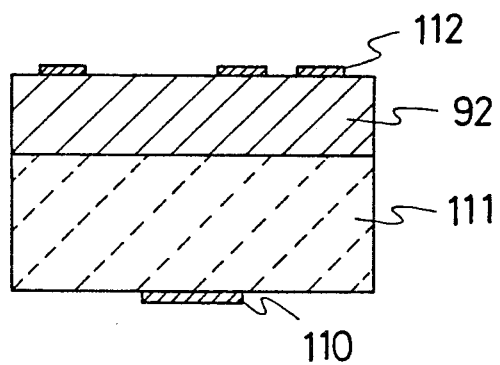

FIG. 18 shows the 13th example of the invention, which incorporates a GaAs substrate 111, a Zn-Al-S or Zn-Cd-Al-S luminescent material layer 92, and electrodes 110 and 112. As is shown in this example, the luminescent material of the invention is highly suitable as a luminescent material in a blue-ultraviolet luminescent device integrated with a semiconductor.

It is apparent from the above examples that the luminescent material of the invention is highly useful as a blue-green luminescent material for various practical applications under excitation of an electron beam, light beam, electric field, current injection, ion beam (plasma), or the like.

The luminescent material provided by the present invention enjoys the following effects:

(1) Since the Al concentration which acts as a criterion of the luminescent-center concentration is as high as the Al component ratio, it is far higher than the luminescent-center concentration of a conventional donor-acceptor type material. Further, the luminescent characteristics thereof can easily be controlled by adjusting the Al concentration. Therefore, the material can exhibit a blue-green luminescence of a high luminance and high efficiency.

(2) The luminescent wavelength (luminescent energy) can be designed by varying the Cd or Al component ratio. In particular, even a slight variation of the Al-component ratio makes it possible to select the luminescent wavelength within a wide range, resulting in a high selectivity and easy selection of the luminescent wavelength.

(3) Since the luminescent wavelength can be varied with the Al concentration, luminescent materials of different wavelengths can be prepared by varying only the Al-component ratio without virtually varying the component ratios of Zn and Cd, whereby it becomes very easy to prepare a film of a multicolor luminescent material.

(4) Since variation of the Al concentration enables to vary not only the luminescent wavelength but also the luminescent intensity, it becomes possible to decide the wavelength of each color in a multicolor construction with Cd- and Al-component ratios, and at the same time to independently design the luminescent intensity to be a desirable relative wavelength in view of, for example, visibility.

As stated above, the luminescent material of the present invention is a blue-green luminescent material of high luminance and efficiency capable of being designed in luminescent wavelength and intensity, and highly useful in a blue-luminescent device being a basic device for opto-electronics, a blue-luminescent display apparatus, and a luminescent display apparatus using a green luminescence of high luminance.

What is claimed is:

1. A thin film luminescent material comprising a single crystalline sulfide solid solution of cubic- or hexagonal-system represented by the formula:

$$Zn_{1-(x+y)}Cd_yAl_xS$$

wherein x and y satisfy $0.001 \leq x < 0.1$, $0 < y \leq 0.5$, respectively.

2. The thin film luminescent material of claim 1 in which the sulfide solid solution is represented by the formula:

$$Zn_{1-(x+y)}Cd_yAl_xS$$

wherein x and y satisfy $0.001 \leq x < 0.1$ and $0.299 \leq y < 0.5$.

3. A luminescent material comprising:
a thin film single crystalline sulfide solid solution of cubic- or hexagonal-system represented by the formula:

$$Zn_{1-(x+y)}Cd_yAl_xS$$

wherein x nd y satisfy $0.001 \leq x < 0.1$, $0 < y \leq 0.5$, respectively; and
a substrate,
said thin film being formed on said substrate by a physical vapor deposition.

4. A luminescent material comprising a thin film single crystalline sulfide solid solution of cubic- or hexagonal-system represented by the formula:

$$Zn_{1-(x+y)}Cd_yAl_xS$$

wherein x and y satisfy $0.001 \leq x < 0.1$, $0 < y \leq 0.5$, respectively, on a single crystalline substrate of ZnS, Si or GaAs.

5. A luminescent material comprising:
a thin film single crystalline solid sulfide solution cubic- or hexagonal-system represented by the formula:

$$Zn_{1-(x+y)}Cd_yAl_xS$$

wherein x and y satisfy $0.001 \leq x < 0.1$, $0 < y \leq 0.5$, respectively;
a thin film luminescent material of ZnCdAl; and
a substrate
said thin film and said thin film luminescent material of ZnCdAl being alternatively and in parallel formed on said substrate.

6. A luminescent material comprising:
a thin film single crystalline solid sulfide solution cubic- or hexagonal-system represented by the formula:

$$Zn_{1-(x+y)}Cd_yAl_xS$$

wherein x and y satisfy $0.001 \leq x < 0.1$, $0 < y \leq 0.5$, respectively;
a carrier injection layer formed on said thin film;
a conductive layer;
two electrodes and
a substrate,
said thin film being formed on said substrate via said conductive layer, said two electrodes being formed on said thin film and said carrier injection layer.

* * * * *